(12) United States Patent
Nachimuthu et al.

(10) Patent No.: US 10,728,024 B2
(45) Date of Patent: Jul. 28, 2020

(54) TECHNOLOGIES FOR PROVIDING RUNTIME CODE IN AN OPTION ROM

(71) Applicant: Intel Corporation, Santa Clara, CA (US)

(72) Inventors: Murugasamy K. Nachimuthu, Beaverton, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 105 days.

(21) Appl. No.: 15/856,644

(22) Filed: Dec. 28, 2017

(65) Prior Publication Data

US 2019/0042277 A1 Feb. 7, 2019

Related U.S. Application Data

(60) Provisional application No. 62/584,401, filed on Nov. 10, 2017.

(30) Foreign Application Priority Data

Aug. 30, 2017 (IN) .............................. 201741030632

(51) Int. Cl.
*G06F 15/177* (2006.01)
*H04L 9/08* (2006.01)
(Continued)

(52) U.S. Cl.
CPC .......... *H04L 9/0819* (2013.01); *G06F 3/0604* (2013.01); *G06F 3/0605* (2013.01); *G06F 3/065* (2013.01); *G06F 3/067* (2013.01); *G06F 3/0611* (2013.01); *G06F 3/0613* (2013.01); *G06F 3/0629* (2013.01); *G06F 3/0631* (2013.01); *G06F 3/0632* (2013.01); *G06F 3/0644* (2013.01); *G06F 3/0647* (2013.01); *G06F 3/0659* (2013.01); *G06F 3/0673* (2013.01); *G06F 3/0683* (2013.01); *G06F 3/0685* (2013.01); *G06F 9/28* (2013.01); *G06F 9/445* (2013.01); *G06F 9/4406* (2013.01); *G06F 9/4411* (2013.01); *G06F 9/4494* (2018.02); *G06F 9/5044* (2013.01); *G06F 9/5088* (2013.01); *G06F 12/023* (2013.01);
(Continued)

(58) Field of Classification Search
None
See application file for complete search history.

(56) References Cited

U.S. PATENT DOCUMENTS 5,822,582 A * 10/1998 Doragh ................. G06F 9/4408
713/2
6,223,271 B1 * 4/2001 Cepulis ............... G06F 12/0292
711/102
(Continued)

*Primary Examiner* — Volvick Derose
(74) *Attorney, Agent, or Firm* — Barnes & Thornburg LLP

(57) ABSTRACT

Technologies for utilizing a runtime code present in an option read only memory (ROM) include a sled that includes a device having an option ROM with runtime code indicative of a runtime function of the device. The sled is to detect, in a boot process, the device on the sled, access, in the boot process, the runtime code in the option ROM of the detected device to identify the runtime function, and execute, in a runtime process, the runtime function associated with the runtime code. Other embodiments are also described and claimed.

25 Claims, 16 Drawing Sheets

(51) Int. Cl.

| | | |
|---|---|---|
| G06F 3/06 | (2006.01) | |
| G06F 9/50 | (2006.01) | |
| H04L 29/06 | (2006.01) | |
| H04L 29/08 | (2006.01) | |
| G06F 16/25 | (2019.01) | |
| G06F 16/2453 | (2019.01) | |
| H04L 12/861 | (2013.01) | |
| G11C 8/12 | (2006.01) | |
| G11C 29/02 | (2006.01) | |
| H04L 12/24 | (2006.01) | |
| G06F 30/34 | (2020.01) | |
| G11C 29/36 | (2006.01) | |
| G11C 29/38 | (2006.01) | |
| G11C 29/44 | (2006.01) | |
| G06F 16/22 | (2019.01) | |
| G06F 16/2455 | (2019.01) | |
| G06F 12/02 | (2006.01) | |
| G06F 12/14 | (2006.01) | |
| G06F 13/16 | (2006.01) | |
| G06F 15/173 | (2006.01) | |
| G06F 13/40 | (2006.01) | |
| G06F 13/42 | (2006.01) | |
| G06F 9/448 | (2018.01) | |
| G06F 9/28 | (2006.01) | |
| G06F 15/16 | (2006.01) | |
| H04L 12/703 | (2013.01) | |
| H04L 12/743 | (2013.01) | |
| H04L 12/801 | (2013.01) | |
| H04L 12/803 | (2013.01) | |
| H04L 12/935 | (2013.01) | |
| H04L 12/931 | (2013.01) | |
| G06F 9/4401 | (2018.01) | |
| G06F 9/445 | (2018.01) | |
| G06F 12/06 | (2006.01) | |
| G06F 16/23 | (2019.01) | |
| G06F 16/248 | (2019.01) | |
| G06F 16/901 | (2019.01) | |
| G06F 16/11 | (2019.01) | |
| G06F 12/0802 | (2016.01) | |
| G06F 12/1045 | (2016.01) | |

(52) U.S. Cl.
CPC .......... *G06F 12/06* (2013.01); *G06F 12/0607* (2013.01); *G06F 12/14* (2013.01); *G06F 13/1663* (2013.01); *G06F 13/1668* (2013.01); *G06F 13/4068* (2013.01); *G06F 13/42* (2013.01); *G06F 15/161* (2013.01); *G06F 15/17331* (2013.01); *G06F 16/119* (2019.01); *G06F 16/221* (2019.01); *G06F 16/2237* (2019.01); *G06F 16/2255* (2019.01); *G06F 16/2282* (2019.01); *G06F 16/2365* (2019.01); *G06F 16/248* (2019.01); *G06F 16/2453* (2019.01); *G06F 16/2455* (2019.01); *G06F 16/24553* (2019.01); *G06F 16/25* (2019.01); *G06F 16/9014* (2019.01); *G06F 30/34* (2020.01); *G11C 8/12* (2013.01); *G11C 29/028* (2013.01); *G11C 29/36* (2013.01); *G11C 29/38* (2013.01); *G11C 29/44* (2013.01); *H04L 9/0894* (2013.01); *H04L 41/0213* (2013.01); *H04L 41/0668* (2013.01); *H04L 41/0677* (2013.01); *H04L 41/0893* (2013.01); *H04L 41/0896* (2013.01); *H04L 45/28* (2013.01); *H04L 45/7453* (2013.01); *H04L 47/11* (2013.01); *H04L 47/125* (2013.01); *H04L 49/30* (2013.01); *H04L 49/351* (2013.01); *H04L 49/9005* (2013.01); *H04L 69/12* (2013.01); *H04L 69/22* (2013.01); *H04L 69/32* (2013.01); *H04L 69/321* (2013.01); *G06F 9/4401* (2013.01); *G06F 12/0802* (2013.01); *G06F 12/1054* (2013.01); *G06F 12/1063* (2013.01); *G06F 2201/85* (2013.01); *G06F 2209/509* (2013.01); *G06F 2212/1044* (2013.01); *G06F 2212/1052* (2013.01); *G06F 2212/601* (2013.01); *G06F 2213/0064* (2013.01)

(56) References Cited

U.S. PATENT DOCUMENTS

| | | | |
|---|---|---|---|
| 6,816,963 B1 * | 11/2004 | Krithivas | G06F 9/4416 710/10 |
| 6,990,685 B1 * | 1/2006 | Christensen | G06F 9/4408 713/2 |
| 7,100,031 B1 * | 8/2006 | Reason | G06F 9/4403 710/8 |
| 9,411,601 B2 * | 8/2016 | Zimmer | G06F 9/4401 |
| 2003/0105904 A1 * | 6/2003 | Abbondanzio | G06F 13/409 710/302 |
| 2005/0182913 A1 * | 8/2005 | Zimmer | G06T 1/60 711/207 |
| 2006/0282652 A1 * | 12/2006 | El-Haj-mahmoud | G06F 9/4408 713/1 |
| 2007/0083861 A1 * | 4/2007 | Becker | G06F 8/60 717/174 |
| 2007/0233928 A1 * | 10/2007 | Gough | G06F 9/4413 710/301 |
| 2008/0028201 A1 * | 1/2008 | Chu | G06F 9/4405 713/2 |
| 2008/0209096 A1 * | 8/2008 | Lin | G06F 13/387 710/301 |
| 2008/0271163 A1 * | 10/2008 | Stillerman | G06F 21/572 726/30 |
| 2010/0042821 A1 * | 2/2010 | Harmer | G06F 9/4411 713/2 |
| 2010/0064079 A1 * | 3/2010 | Harvey | G06F 3/0227 710/73 |
| 2010/0095044 A1 * | 4/2010 | Cho | G06F 9/4406 710/308 |
| 2010/0223451 A1 * | 9/2010 | Hitaka | G06F 9/4411 713/2 |
| 2012/0159264 A1 * | 6/2012 | Azam | G06F 9/4411 714/48 |
| 2014/0189673 A1 * | 7/2014 | Stenfort | G06F 8/65 717/170 |
| 2014/0281463 A1 * | 9/2014 | Even | G06F 9/4406 713/2 |
| 2015/0271019 A1 * | 9/2015 | Reich | H04L 41/0816 709/221 |
| 2015/0373115 A1 * | 12/2015 | Breakstone | G06F 3/0685 709/217 |
| 2017/0071071 A1 * | 3/2017 | Tseng | H05K 7/1489 |
| 2017/0235696 A1 * | 8/2017 | Huang | G06F 13/4068 710/200 |
| 2017/0257970 A1 * | 9/2017 | Alleman | G06F 1/184 |
| 2017/0277545 A1 * | 9/2017 | Dambal | G06F 9/4403 |
| 2018/0203705 A1 * | 7/2018 | Cooper | G06F 9/4411 |
| 2018/0321947 A1 * | 11/2018 | Liu | G06F 21/575 |

* cited by examiner

US 10,728,024 B2

TECHNOLOGIES FOR PROVIDING RUNTIME CODE IN AN OPTION ROM

CROSS-REFERENCE TO RELATED APPLICATIONS

The present application claims the benefit of Indian Provisional Patent Application No. 201741030632, filed Aug. 30, 2017 and U.S. Provisional Patent Application No. 62/584,401, filed Nov. 10, 2017.

BACKGROUND

Typically, an add-in device, such as a network interface controller, a data storage device, or other component or circuitry that provides supplemental functionality to a compute device when it is installed, is equipped with a read-only memory that includes firmware (e.g., boot code) that is usable by the compute device to configure the add-in device during a boot process. Any runtime functions (e.g., functions to be executed by an operating system or other software after the initial boot process) of the add-in device are supported by the basic input/output system (BIOS) of the compute device (e.g., through firmware in the BIOS). As such, designing and manufacturing a BIOS that is capable of supporting a wide variety of different types of add-in devices that may be added to the compute device is complex and time consuming, and adds to the total cost and size of the circuitry of the BIOS. The added cost and size, while relatively minor when considering a single compute device, may be significant for a data center that includes hundreds or thousands of compute devices.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
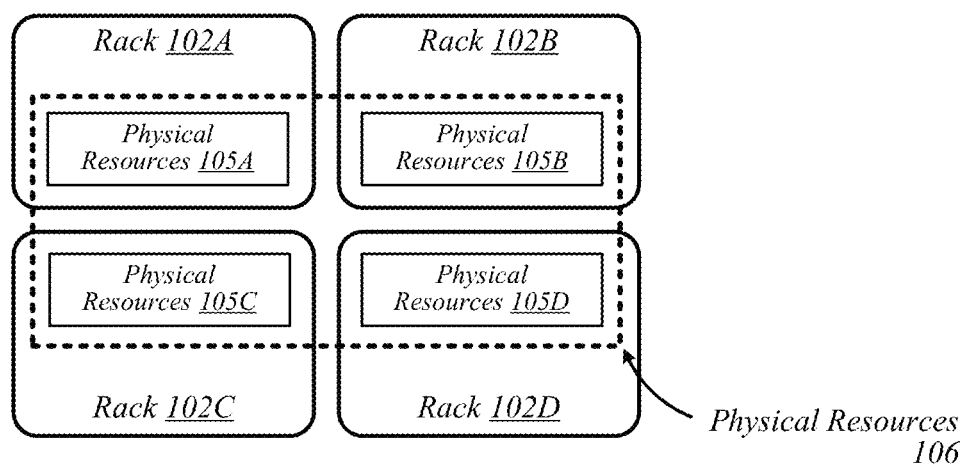
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources (PCRs) 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as DIMMs, are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, ASICs, etc.), and data storage drives that are physically disaggregated, and provide them to compute resources (e.g., processors) on an as needed basis, enabling the compute resources to access the pooled resources as if they were local. The illustrative data center 100 additionally receives utilization information for the various resources, predicts resource utilization for different types of workloads based on past resource utilization, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
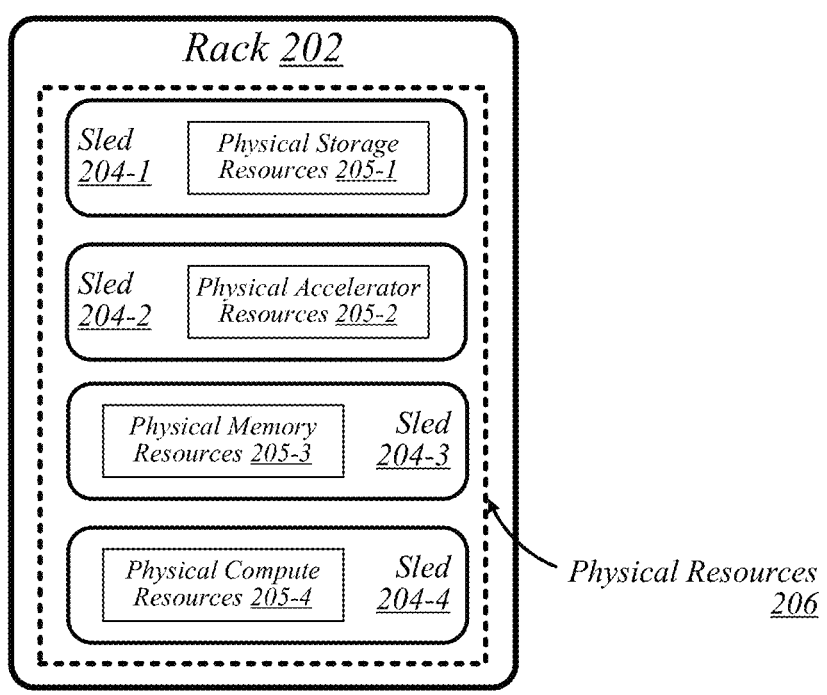
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
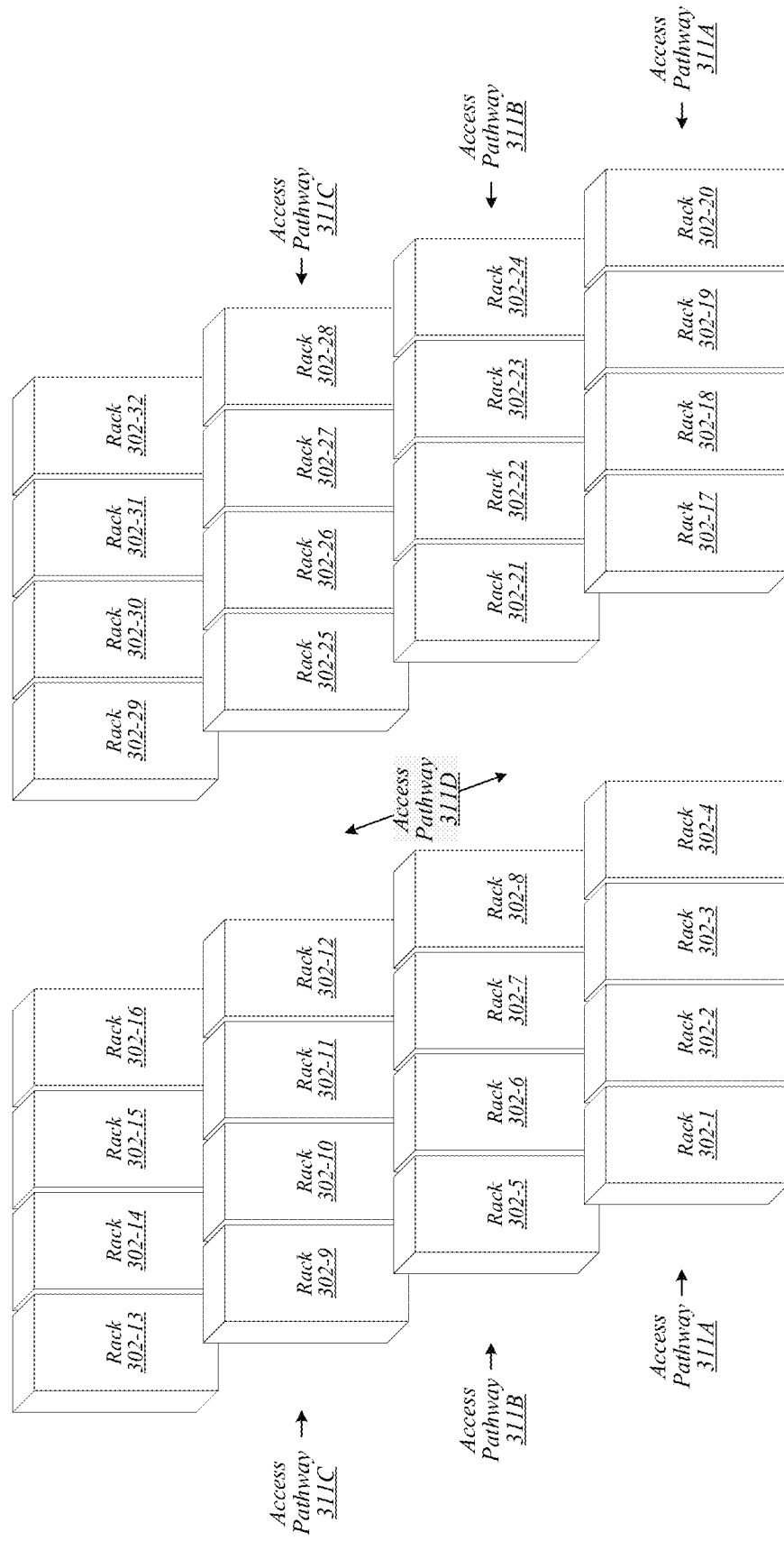
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
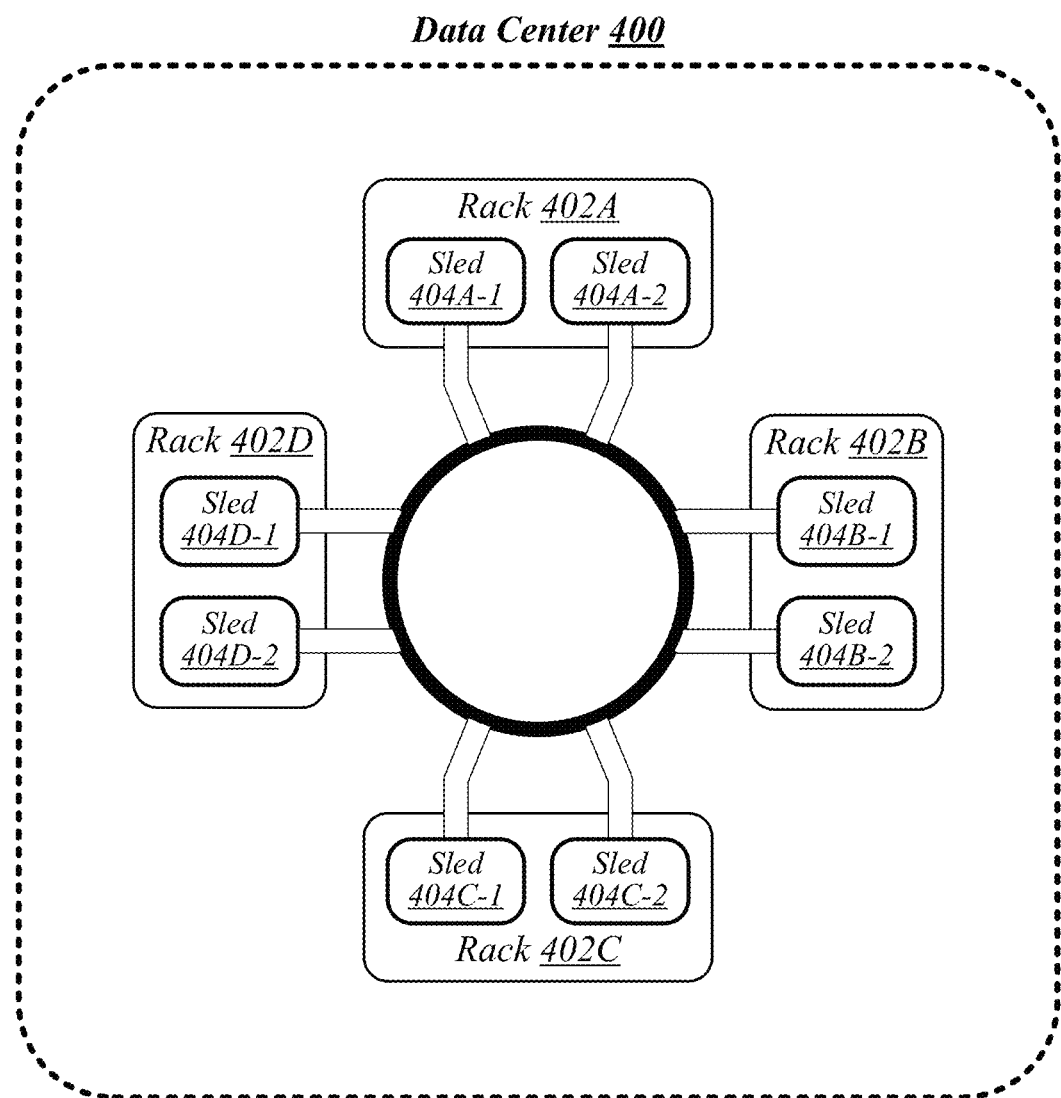
FIG. 4 is a diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
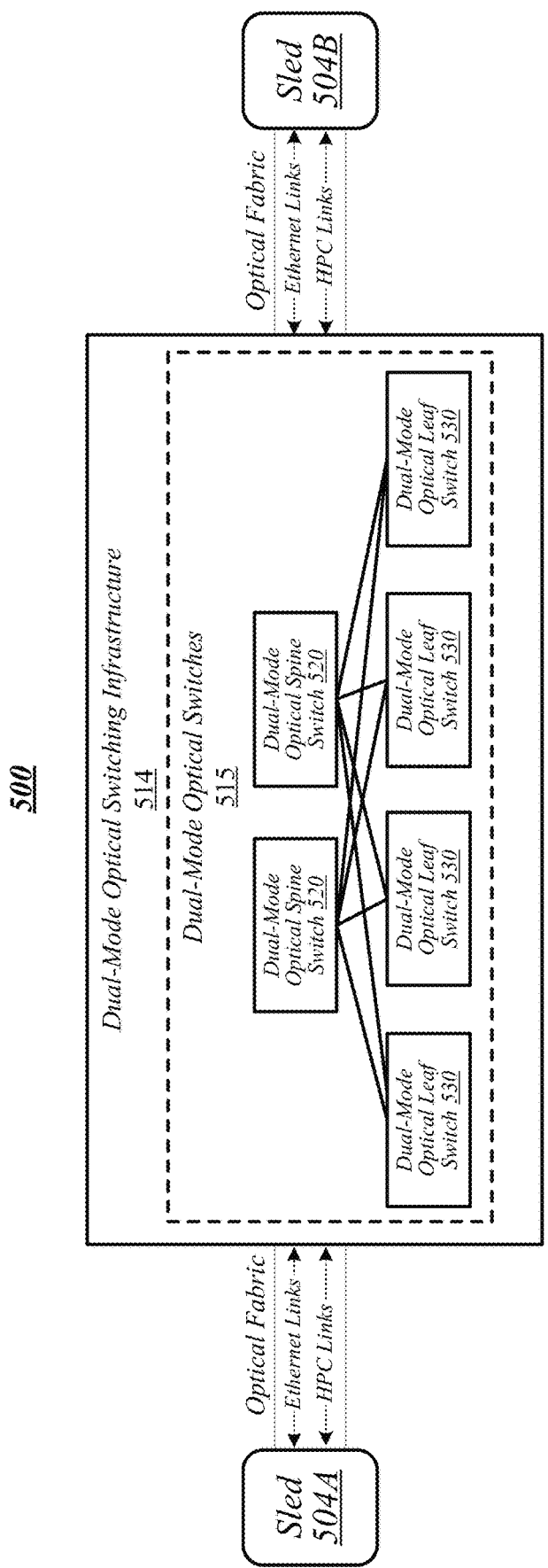
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
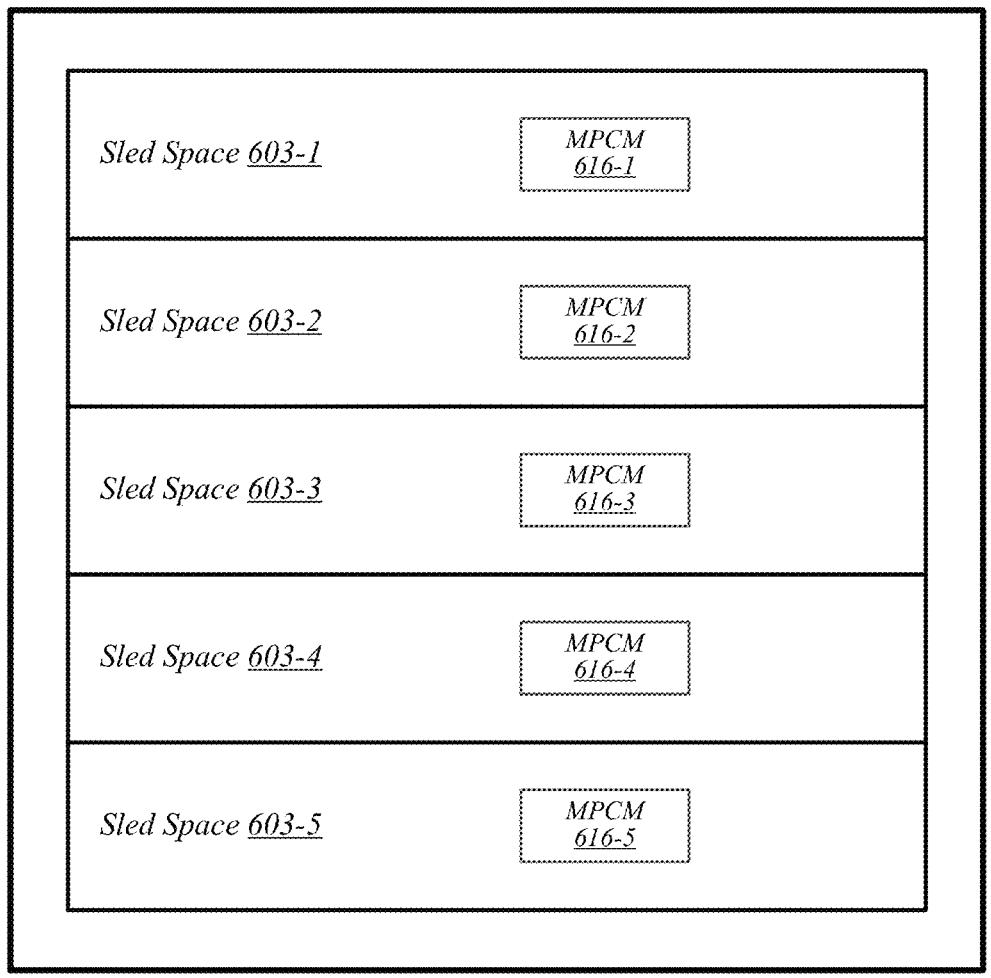
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
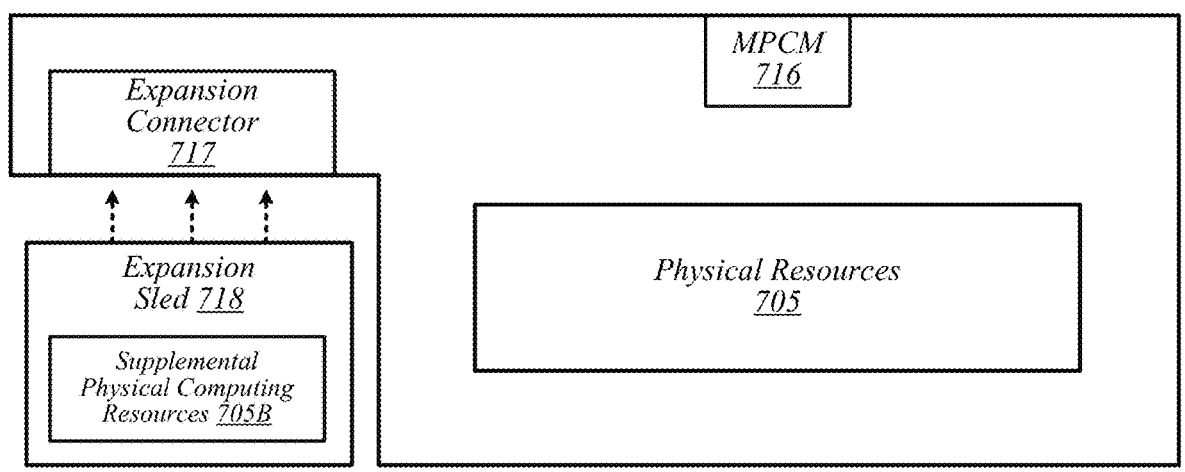
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
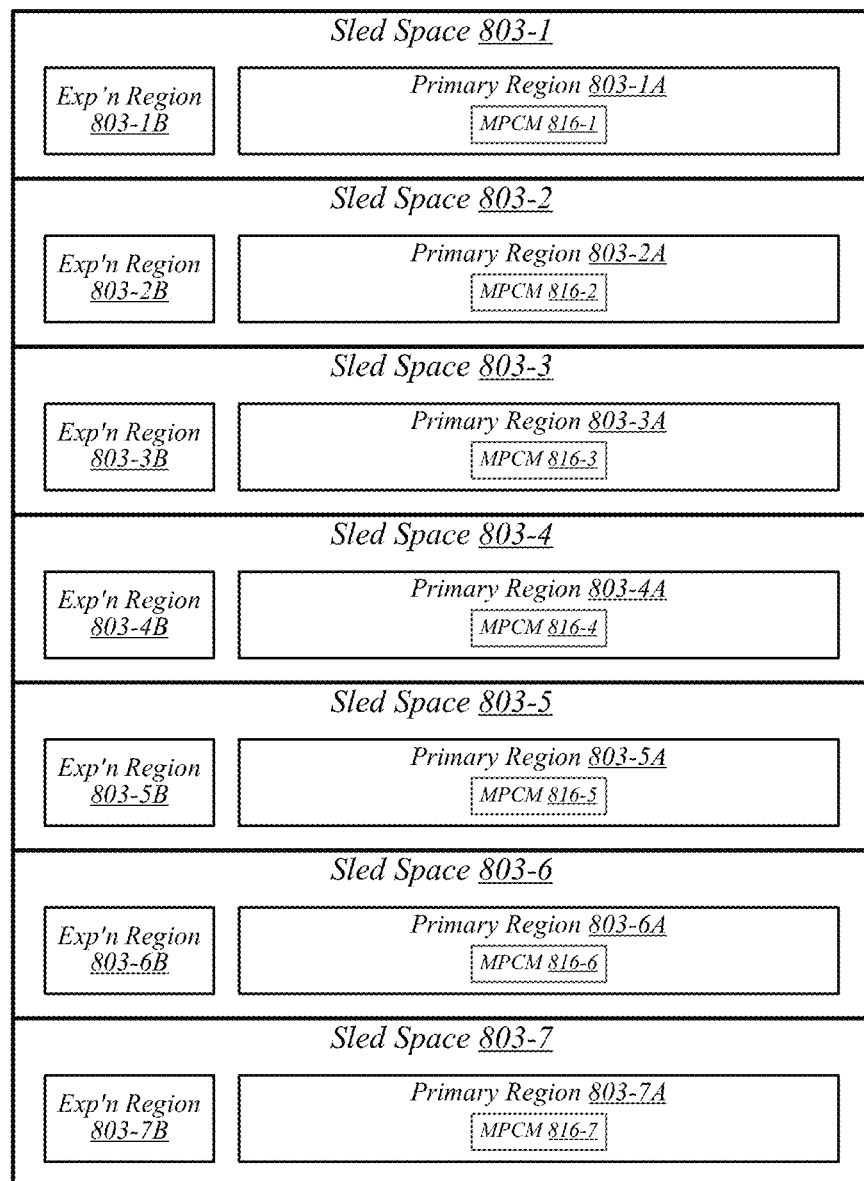
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
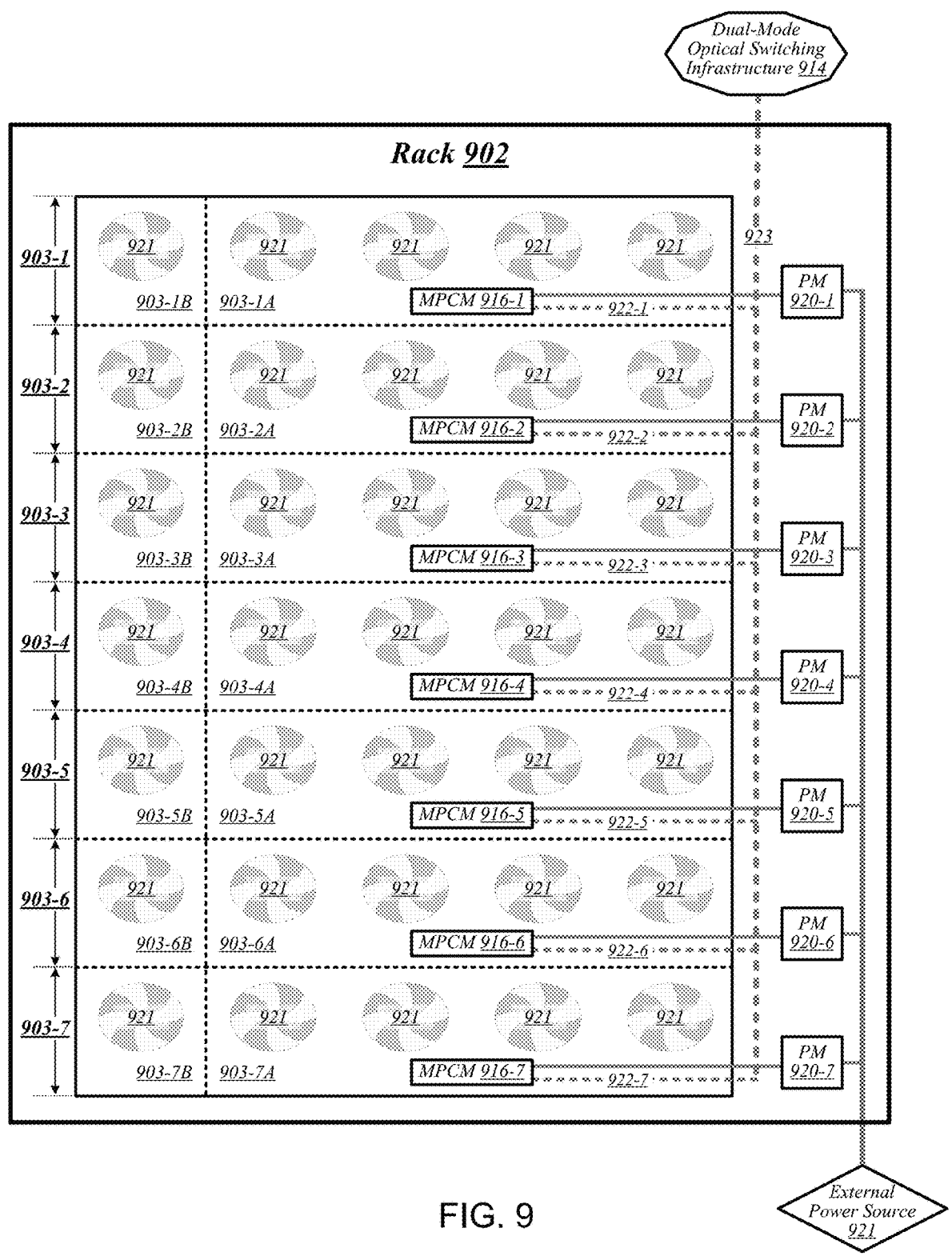
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
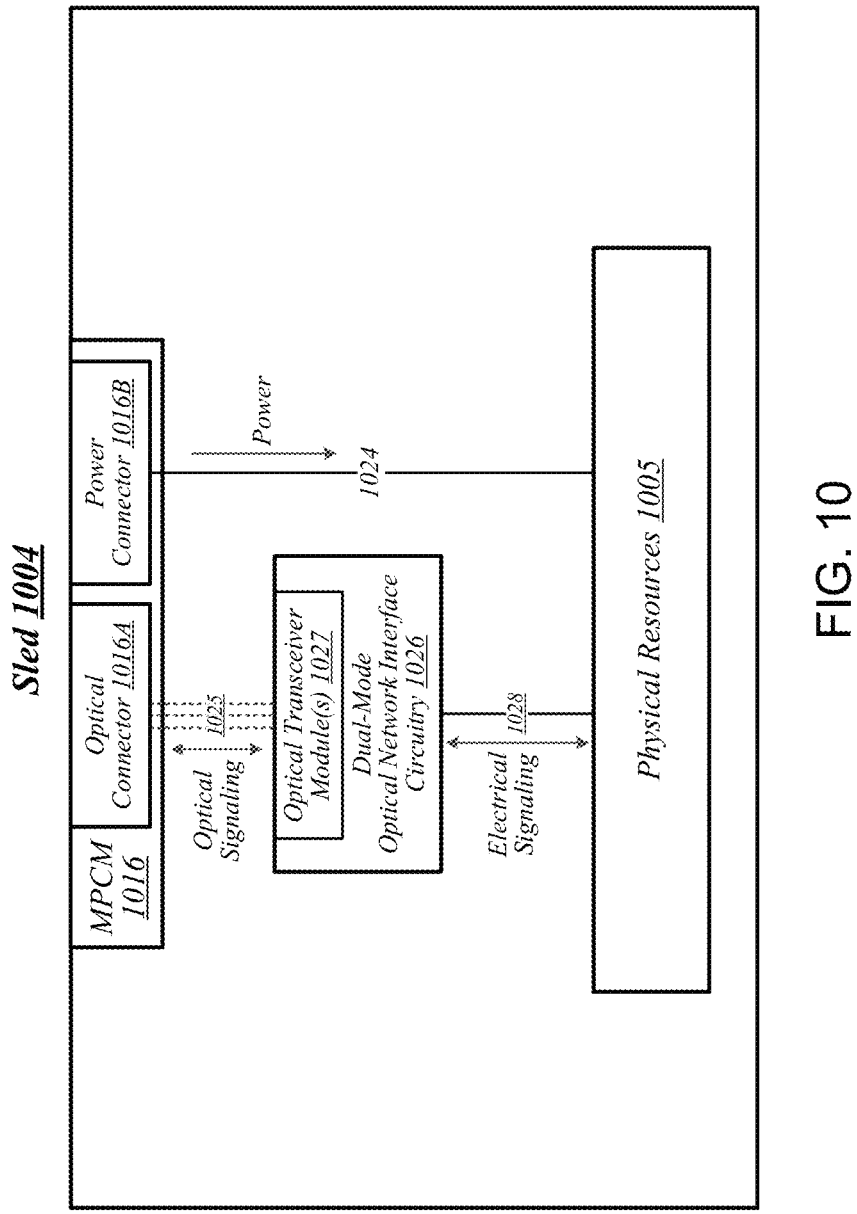
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250W), as described above with reference to FIG. 9, in some embodiments, a sled may include one or more additional features to facilitate air cooling, such as a heatpipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
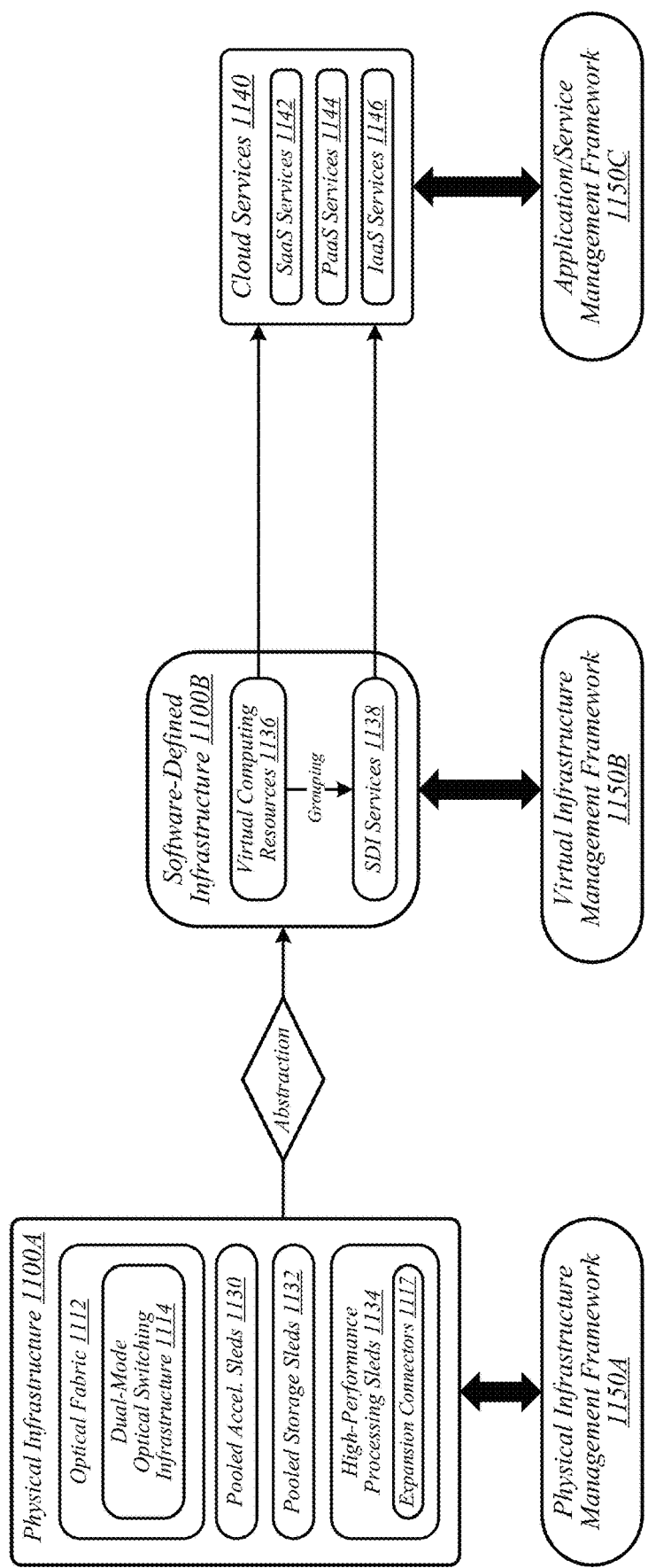
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide QoS management capabilities for cloud services 1140. The embodiments are not limited in this context.

Figure 12:
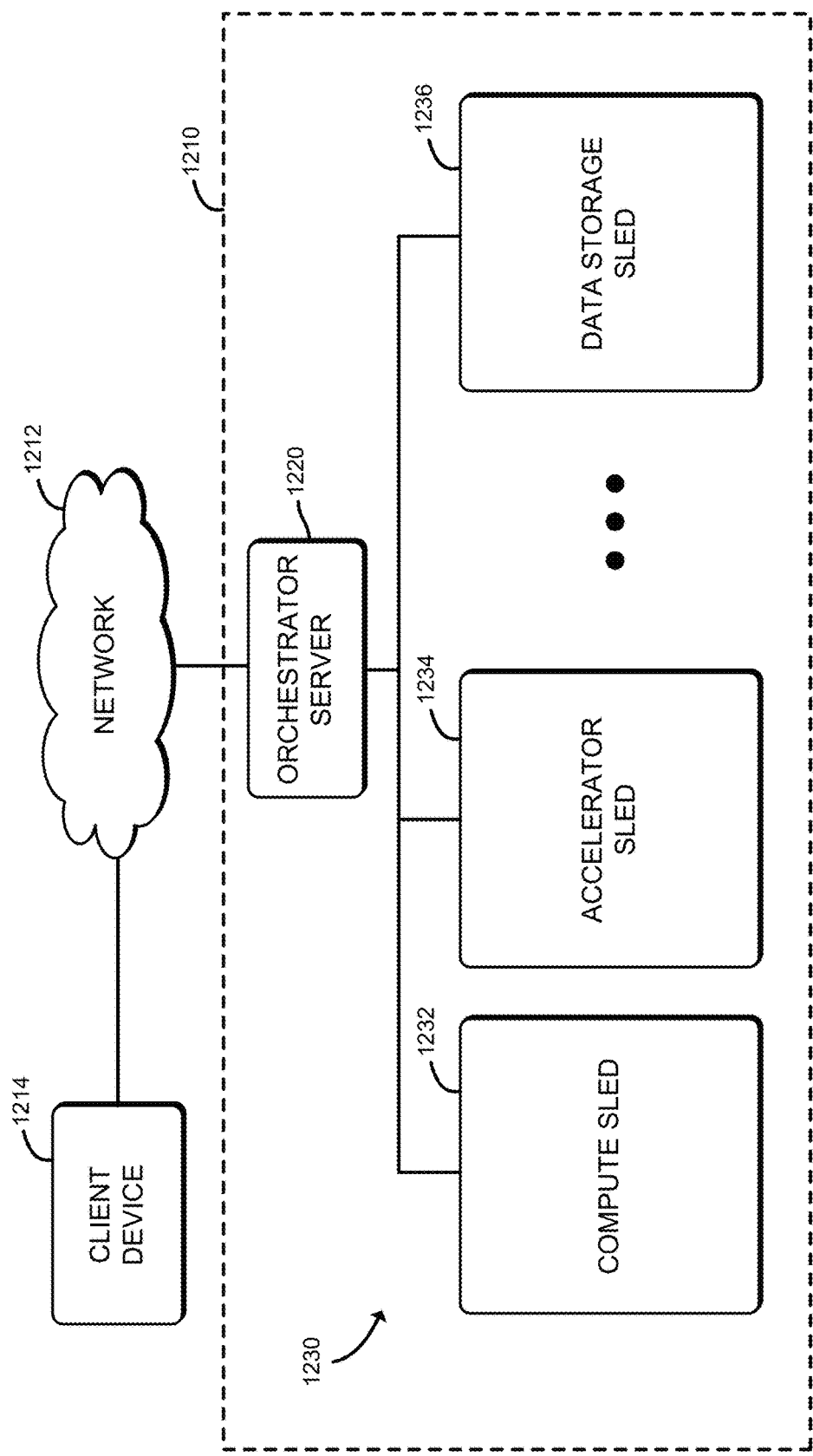
FIG. 12 is a simplified block diagram of at least one embodiment of a system for utilizing runtime codes in the option ROMs of devices to execute runtime functions.

Referring now to FIG. 12, a system 1210 for utilizing runtime functions defined in the option ROMs of devices included in one or more sleds of a data center may be implemented in accordance with the data centers 100, 300, 400, 1100 described above with reference to FIGS. 1, 3, 4, and 11. In the illustrative embodiment, the system 1210 includes an orchestrator server 1220 communicatively coupled to multiple sleds 1230 including a compute sled 1232, an accelerator sled 1234, and a data storage sled 1236. While three sleds 1230 are shown, it should be understood that in other embodiments, the system 1210 may include a different number of sleds 1230 and/other types of sleds (e.g., a memory sled). One or more of the sleds 1230 may be grouped into a managed node, such as by the orchestrator server 1220, to collectively perform a workload (e.g., an application). A managed node may be embodied as an assembly of resources (e.g., physical resources 206), such as compute resources (e.g., physical compute resources 205-4), memory resources (e.g., physical memory resources 205-3), storage resources (e.g., physical storage resources 205-1), or other resources (e.g., physical accelerator resources 205-2), from the same or different sleds (e.g., the sleds 204-1, 204-2, 204-3, 204-4, etc.) or racks (e.g., one or more of racks 302-1 through 302-32). Further, a managed node may be established, defined, or "spun up" by the orchestrator server 1220 at the time a workload is to be assigned to the managed node or at any other time, and may exist regardless of whether any workloads are presently assigned to the managed node. The system 1210 may be located in a data center and provide storage and compute services (e.g., cloud services) to a client device 1214 that is in communication with the system 1210 through a network 1212. The orchestrator server 1220 may support a cloud operating environment, such as OpenStack, and managed nodes established by the orchestrator server 1220 may execute one or more applications or processes (i.e., workloads), such as in virtual machines or containers, on behalf of a user of the client device 1214.

In the illustrative embodiment, an add-in device (e.g., an add-in network interface controller, an accelerator device such as an FPGA, a data storage device, etc.) includes an option ROM (e.g., read only memory) that contains runtime code, in addition to typical boot code used to configure the add-in device. The runtime code is accessible to the BIOS on the sled and, during boot, the BIOS detects and decodes the components of the runtime code. The option ROM includes fields that describe each runtime function present in the option ROM for the add-in device. The BIOS exposes the functions in the runtime code to the unified extensible firmware interface (UEFI) and/or the operating system for use thereby. By providing the runtime code in the option ROM of the add-in device, the BIOS need not be designed with specific add-in devices in mind (i.e., designed to implement device-specific functions for each potential add-in device that may be added to the sled 1230). As such, the BIOS may be simpler and less expensive to manufacture as compared to typical systems, thereby reducing the cost of each sled 1230 and enabling an owner of the system 1210 to apply the cost savings to adding more sleds 1230 (e.g., more workload processing capacity) to the system 1210.

Figure 13:
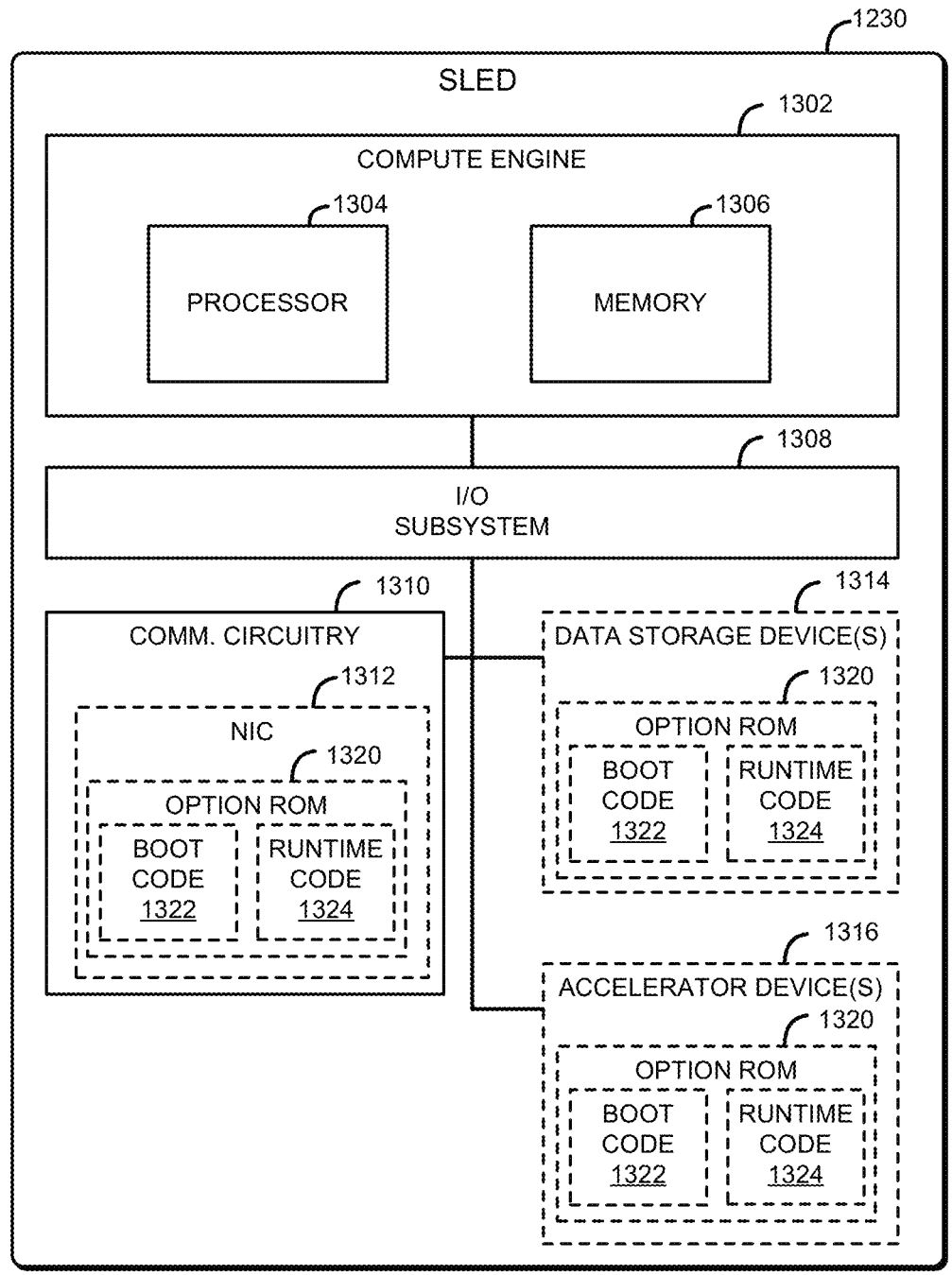
FIG. 13 is a simplified block diagram of at least one embodiment of a sled of the system of FIG. 12.

Referring now to FIG. 13, the sled 1230 may be embodied as any type of compute device capable of performing the functions described herein, including detecting, in a boot process, a device (e.g., an add-in device) on the sled, accessing, in the boot process, the runtime code in the option ROM of the detected device to identify the runtime function, and executing, in a runtime process, the runtime function associated with the runtime code. As shown in FIG. 13, the illustrative compute sled 1230 includes a compute engine 1302, an input/output (I/O) subsystem 1308, and communication circuitry 1310. As described in more detail herein, the sled 1230 may also be equipped with one or more other devices, such as one or more data storage devices 1314 or one or more accelerator devices 1316. Of course, in other embodiments, the compute sled 1230 may include other or additional components, such as those commonly found in a computer (e.g., display, peripheral devices, etc.). Additionally, in some embodiments, one or more of the illustrative components may be incorporated in, or otherwise form a portion of, another component.

The compute engine 1302 may be embodied as any type of device or collection of devices capable of performing various compute functions described below. In some embodiments, the compute engine 1302 may be embodied as a single device such as an integrated circuit, an embedded system, a field-programmable gate array (FPGA), a system-on-a-chip (SOC), or other integrated system or device. In the illustrative embodiment, the compute engine 1302 includes or is embodied as a processor 1304 and a memory 1306. The processor 1304 may be embodied as any type of processor capable of performing the functions described herein. For example, the processor 1304 may be embodied as a single or multi-core processor(s), a microcontroller, or other processor or processing/controlling circuit. In some embodiments, the processor 1304 may be embodied as, include, or be coupled to an FPGA, an application specific integrated circuit (ASIC), reconfigurable hardware or hardware circuitry, or other specialized hardware to facilitate performance of the functions described herein.

The memory 1306 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory device is a block addressable memory device, such as those based on NAND or NOR technologies. A memory device may also include future generation nonvolatile devices, such as a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 1306 may be integrated into the processor 1304. In operation, the memory 1306 may store various software and data used during operation such as detected device data, runtime function data, applications, programs, and libraries.

The compute engine 1302 is communicatively coupled to other components of the sled 1230 via the I/O subsystem 1308, which may be embodied as circuitry and/or components to facilitate input/output operations with the compute engine 1302 (e.g., with the processor 1304 and/or the memory 1306) and other components of the sled 1230. For example, the I/O subsystem 1308 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 1308 may form a portion of a system-on-a-chip (SoC) and be incorporated, along with one or more of the processor 1304, the memory 1306, and other components of the sled 1230, into the compute engine 1302.

The communication circuitry 1310 may be embodied as any communication circuit, device, or collection thereof, capable of enabling communications over the network 1212 between the sled 1230 and another compute device (e.g., the orchestrator server 1220, the sleds 1232, 1234, 1236, etc.). The communication circuitry 1310 may be configured to use any one or more communication technology (e.g., wired or wireless communications) and associated protocols (e.g., Ethernet, Bluetooth®, Wi-Fi®, WiMAX, etc.) to effect such communication.

The communication circuitry 1310 may include a network interface controller (NIC) 1312 (e.g., as an add-in device), which may also be referred to as a host fabric interface (HFI). The NIC 1312 may be embodied as one or more add-in-boards, daughter cards, network interface cards, controller chips, chipsets, or other devices that may be used by the compute sled 1230 to connect with another compute device (e.g., the orchestrator server 1220, other sleds 1230, etc.). In some embodiments, the NIC 1312 may be embodied as part of a system-on-a-chip (SoC) that includes one or more processors, or included on a multichip package that also contains one or more processors. In some embodiments, the NIC 1312 may include a local processor (not shown) and/or a local memory (not shown) that are both local to the NIC 1312. In such embodiments, the local processor of the NIC 1312 may be capable of performing one or more of the functions of the compute engine 1302 described herein.

Additionally or alternatively, in such embodiments, the local memory of the NIC 1312 may be integrated into one or more components of the sled 1230 at the board level, socket level, chip level, and/or other levels.

The one or more illustrative data storage devices 1314 may be embodied as any type of devices configured for short-term or long-term storage of data such as, for example, memory devices and circuits, memory cards, hard disk drives, solid-state drives, or other data storage devices. Each data storage device 1314 may include a system partition that stores data and firmware code for the data storage device 1314. Each data storage device 1314 may also include one or more operating system partitions that store data files and executables for operating systems. As described above, the one or more accelerator devices 1316 may be included in the sled 1230 as well. Each accelerator device 1316 may be embodied as any device or circuitry (e.g., a specialized processor, an FPGA, an ASIC, a graphics processing unit (GPU), reconfigurable hardware, etc.) capable of accelerating the execution of a function.

Each of the NIC 1312, the data storage device(s) 1314, and the accelerator device(s) 1316 may include an option ROM, which may be embodied as a ROM that includes firmware having boot code 1322 and runtime code 1324. The boot code 1322 may be embodied as any code usable by the sled 1230 to configure the device for operation during a boot process, such as establishing memory addresses to be mapped to the device for I/O. The runtime code 1324 may be embodied as any code usable by the sled 1230 to identify runtime functions of the device (e.g., the NIC 1312, the data storage device 1314, the accelerator device 1316) and any associated parameters that may be called (e.g., executed) by the unified extensible firmware interface (UEFI), the operating system, or other software of the sled 1230 after the boot process has completed (e.g., without the use of specialized software drivers or firmware on the sled 1230, such as in the BIOS). In some embodiments the runtime code 1324 and boot code 1322 are combined and available as a single option ROM. In such embodiments, when the BIOS loads and executes the option ROM, the BIOS may generate a notification that there is a runtime code and determine a size (e.g., a number of bytes) to copy from the option ROM to a different location (e.g., to the memory 1306). Alternatively, the boot code 1322 itself may provide a function list that the BIOS/UEFI can expose to the operating system or other management software of the compute sled 1230. In some embodiments, the runtime code may provide a runtime function for the operating system and/or for device management purposes. Further, in some embodiments, rather than copying the entire runtime code from the option ROM, the compute sled 1230 may copy a subset of the runtime code that defines a runtime interface usable by the operating system or other management software to call a runtime function defined in the remainder of the runtime code.

The client device 1214 and orchestrator server 1220 may have components similar to those described in FIG. 13. The description of those components of the sled 1230 is equally applicable to the description of components of those devices and is not repeated herein for clarity of the description. Further, it should be appreciated that any of the client device 1214, the orchestrator server 1220, and the sleds 1230 may include other components, sub-components, and devices commonly found in a computing device, which are not discussed above in reference to the sled 1230 and not discussed herein for clarity of the description.

As described above, the client device 1214, the orchestrator server 1220, and the sleds 1230 are illustratively in communication via the network 1212, which may be embodied as any type of wired or wireless communication network, including global networks (e.g., the Internet), local area networks (LANs) or wide area networks (WANs), cellular networks (e.g., Global System for Mobile Communications (GSM), 3G, Long Term Evolution (LTE), Worldwide Interoperability for Microwave Access (WiMAX), etc.), digital subscriber line (DSL) networks, cable networks (e.g., coaxial networks, fiber networks, etc.), or any combination thereof.

Figure 14:
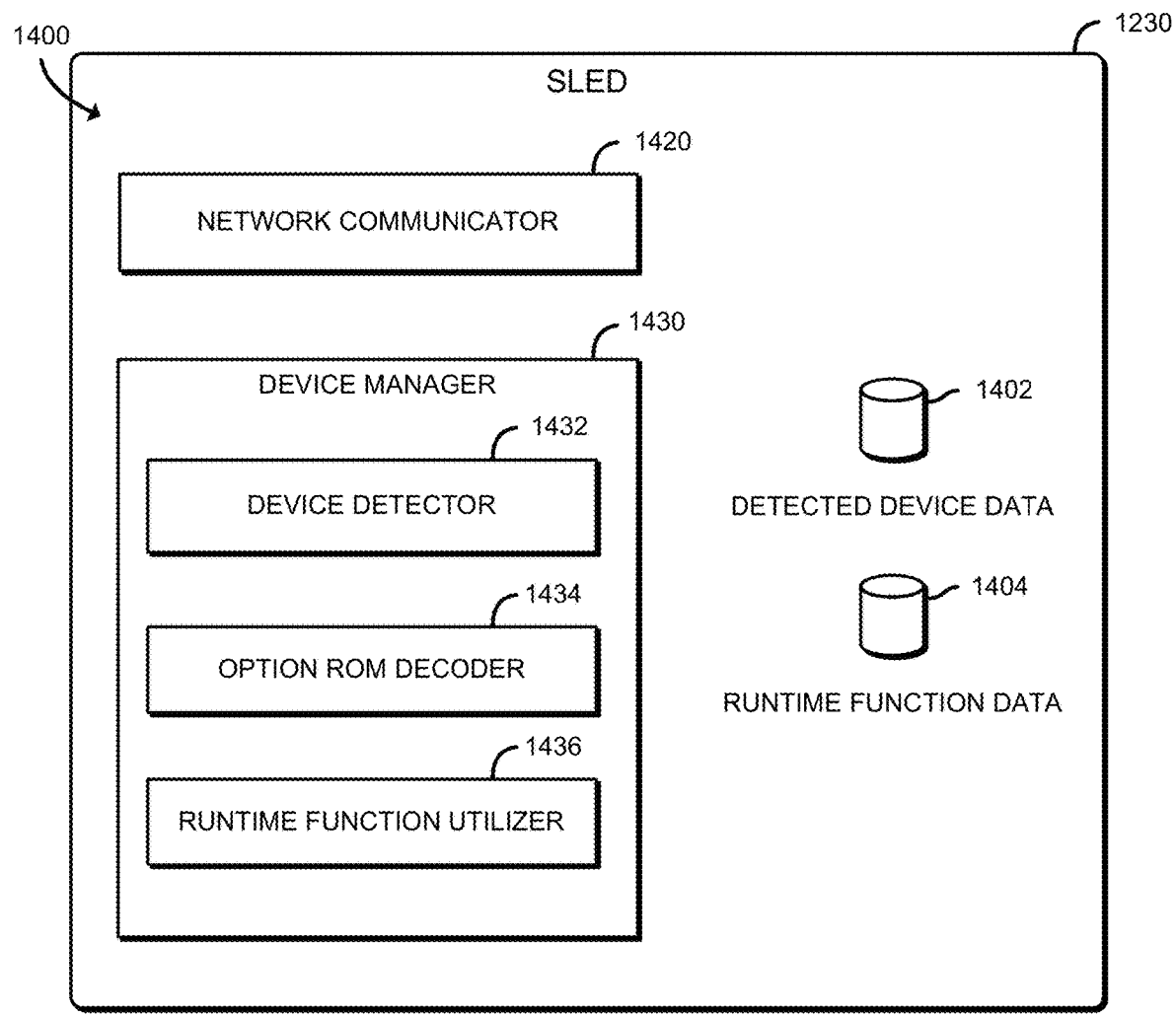
FIG. 14 is a simplified block diagram of at least one embodiment of an environment that may be established by a sled of FIGS. 12 and 13.

Referring now to FIG. 14, the sled 1230 may establish an environment 1400 during operation. The illustrative environment 1400 includes a network communicator 1420 and a device manager 1430. Each of the components of the environment 1400 may be embodied as hardware, firmware, software, or a combination thereof. As such, in some embodiments, one or more of the components of the environment 1400 may be embodied as circuitry or a collection of electrical devices (e.g., network communicator circuitry 1420, device manager circuitry 1430, etc.). It should be appreciated that, in such embodiments, one or more of the network communicator circuitry 1420 or device manager circuitry 1430 may form a portion of one or more of the compute engine 1302, the I/O subsystem 1308, and/or other components of the sled 1230. In the illustrative embodiment, the environment 1400 includes detected device data 1402 which may be embodied as any data indicative of identifiers (e.g., global unique identifiers (GUID), serial numbers, etc.) of each detected add-in device. The detected device data 1402 may additionally include data indicative of the type of each device (e.g., a communication device, a data storage device, an accelerator device) and data usable for communicating with the device, such as addresses of model specific registers (MSRs) associated with each device, and/or one or more memory addresses mapped to the devices. The environment 1400, in the illustrative embodiment, also includes runtime function data 1404, which may be embodied as any data that associates device identifiers (e.g., in the detected device data) with identifiers of runtime functions and associated parameters defined in the corresponding runtime code 1324 in the option ROM 1320 of the device.

In the illustrative environment 1400, the network communicator 1420, which may be embodied as hardware, firmware, software, virtualized hardware, emulated architecture, and/or a combination thereof as discussed above, is configured to facilitate inbound and outbound network communications (e.g., network traffic, network packets, network flows, etc.) to and from the sled 1230, respectively. To do so, the network communicator 1420 is configured to receive and process data packets from one system or computing device (e.g., the orchestrator server 1220) and to prepare and send data packets to another computing device or system (e.g., another sled 1230). Accordingly, in some embodiments, at least a portion of the functionality of the network communicator 1420 may be performed by the communication circuitry 1310, and, in the illustrative embodiment, by the NIC 1312.

The device manager 1430, which may be embodied as hardware, firmware, software, virtualized hardware, emulated architecture, and/or a combination thereof, is configured to detect, in a boot process, the device on the sled 1230, access, in the boot process, the runtime code in the option ROM of the detected device to identify the runtime function, and execute, in a runtime process, the runtime function associated with the runtime code. To do so, in the illustrative embodiment, the device manager 1430 includes a device detector 1432, an option ROM decoder 1434, and a runtime function utilizer 1436. The device detector 1432, in the illustrative embodiment, is configured to detect the presence of devices (e.g., add-in devices) on the sled 1230. The device detector 1432 may do so by querying memory addresses, bus controllers, or other portions of the I/O subsystem 1308 such as in a bus enumeration process. In doing so, the device detector 1432 produces the detected device data 1402 described above.

The option ROM decoder 1434, in the illustrative embodiment, is configured to access the option ROM of each detected device represented in the detected device data 1402, such as through a base address register (BAR) of a peripheral component interconnect express (PCIe) bus. In doing so, in the illustrative embodiment, the option ROM decoder 1434 is further configured to detect boot code of the option ROM (e.g., the boot code 1322) and the runtime code 1324, if present. For example, the runtime code 1324 may be configured to search for a predefined tag (e.g., a set of data values) indicative of the beginning of the runtime code 1324. Further, the option ROM decoder 1434 is configured to parse the runtime code 1324 and identify each runtime function (e.g., a function number, name, or other unique identifier) and associated parameter(s), such as by identifying fields having predefined formats and reading the data from the fields. In doing so, the option ROM decoder 1434, in the illustrative embodiment, is configured to produce the runtime function data 1404.

The runtime function utilizer 1436, in the illustrative embodiment, is configured to expose the runtime function data 1404 to the compute engine 1302 (e.g., to the processor 1304) for use during the runtime of the sled 1230 (e.g., after the boot process has completed). In doing so, the runtime function utilizer 1436 may write the runtime function data 1404 in a memory location (e.g., in the memory 1306) during the boot process and access the runtime function data 1404 after the boot process has completed (e.g., when a workload is being performed in an operating system executed by the compute engine 1302). As such, the runtime function utilizer 1436 may call runtime functions encoded in the option ROM 1320 of the corresponding device (e.g., the NIC 1312, a data storage device 1314, an accelerator device 1316) without relying on a device-specific driver or device-specific firmware to be present in the sled 1230 (e.g., in the BIOS or included in the operating system).

Figure 15:
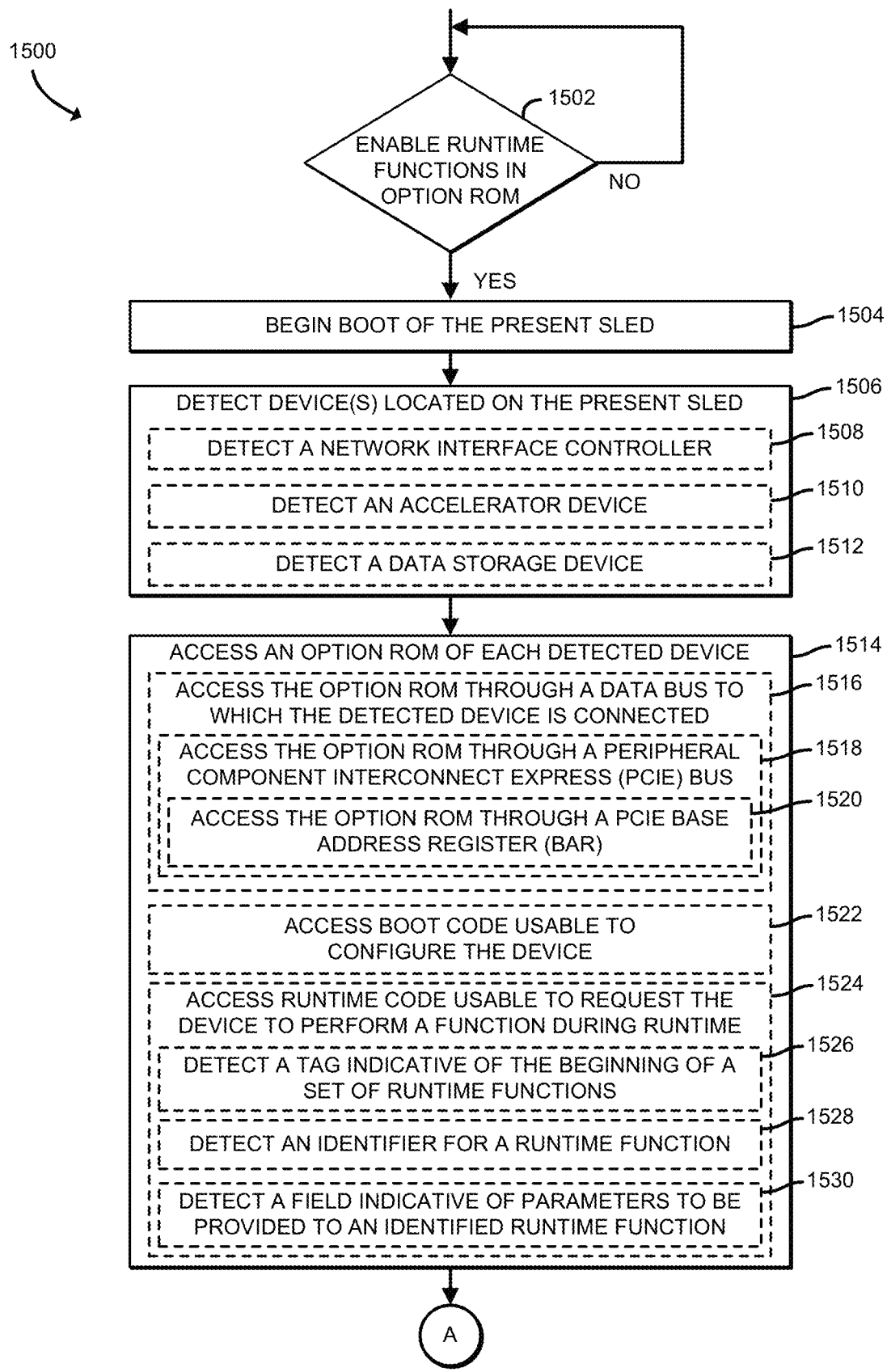
FIGS. 15-16 are a simplified flow diagram of at least one embodiment of a method for utilizing a runtime code in an option ROM of a device that may be performed by a sled of FIGS. 12 and 13.

Referring now to FIG. 15, a sled 1230, in operation, may execute a method 1500 for utilizing a runtime code in an option ROM (e.g., an option ROM 1320) of a device present on the sled 1230. The method 1500 begins with block 1502 in which the compute sled 1230 determines whether to enable the utilization of runtime functions that may be present in the option ROMs of one or more devices present on the sled 1230. In the illustrative embodiment, the sled 1230 may determine to enable the use of runtime functions defined in the option ROM(s) by default and may determine to proceed with the additional operations in the method 1500 in response to being powered on or reset (e.g., to begin a boot process). In other embodiments, the sled 1230 may make the determination based on other factors. Regardless, in response to a determination to proceed, the method 1500 advances to block 1504 in which the sled 1230, in the illustrative embodiment, begins a boot process. As indicated in block 1506, the sled 1230 detects one or more devices located on the present sled 1230. In doing so, the sled may detect a network interface controller (e.g., the NIC 1312), as indicated in block 1508. Additionally or alternatively, the sled 1230 may detect an accelerator device (e.g., the accelerator device 1316), as indicated in block 1510 and/or may detect a data storage device (e.g., the data storage device 1314), as indicated in block 1512.

Subsequently, the method 1500 advances to block 1514 in which the sled 1230 accesses the option ROM 1320 of each detected device. In doing so, the sled 1230 may access the option ROM 1320 through a data bus to which the detected device is connected, as indicated in block 1516. Further, in the illustrative embodiment, the sled 1230 accesses the option ROM 1320 through a peripheral component interconnect express (PCIe) bus, as indicated in block 1518. For example, the sled 1230 may access the option ROM 1320 through a PCIe base address register (BAR), as indicated in block 1520. As indicated in block 1522, the sled 1230, in the illustrative embodiment, accesses boot code (e.g., the boot code 1322) usable to configure the device during the boot process. In doing so, the sled 1230 may execute the accessed boot code to configure the device. As indicated in block 1524, the sled 1230, in the illustrative embodiment, also accesses runtime code (e.g., the runtime code 1324) usable to request the device to perform a function during the runtime of the sled 1230 (e.g., after the boot process has completed). In doing so, the sled 1230 may detect a tag (e.g., a predefined set of data values) indicative of the beginning of a set of one or more runtime functions for the device, as indicated in block 1526. Further, as indicated in block 1528, the sled 1230, in the illustrative embodiment, detects an identifier for each runtime function defined in the runtime code 1324 (e.g., by reading a corresponding field). Additionally, as indicated in block 1530, the sled 1230 may detect a field indicative of parameters to be provided to each runtime function identified in the runtime code (e.g., by reading corresponding field(s)). Subsequently, the method 1500 advances to block 1532 of FIG. 16, in which the sled 1230 determines whether one or more runtime codes were accessed in block 1514 (e.g., whether any of the devices present on the sled 1230 have a runtime code in their option ROM).

Figure 16:
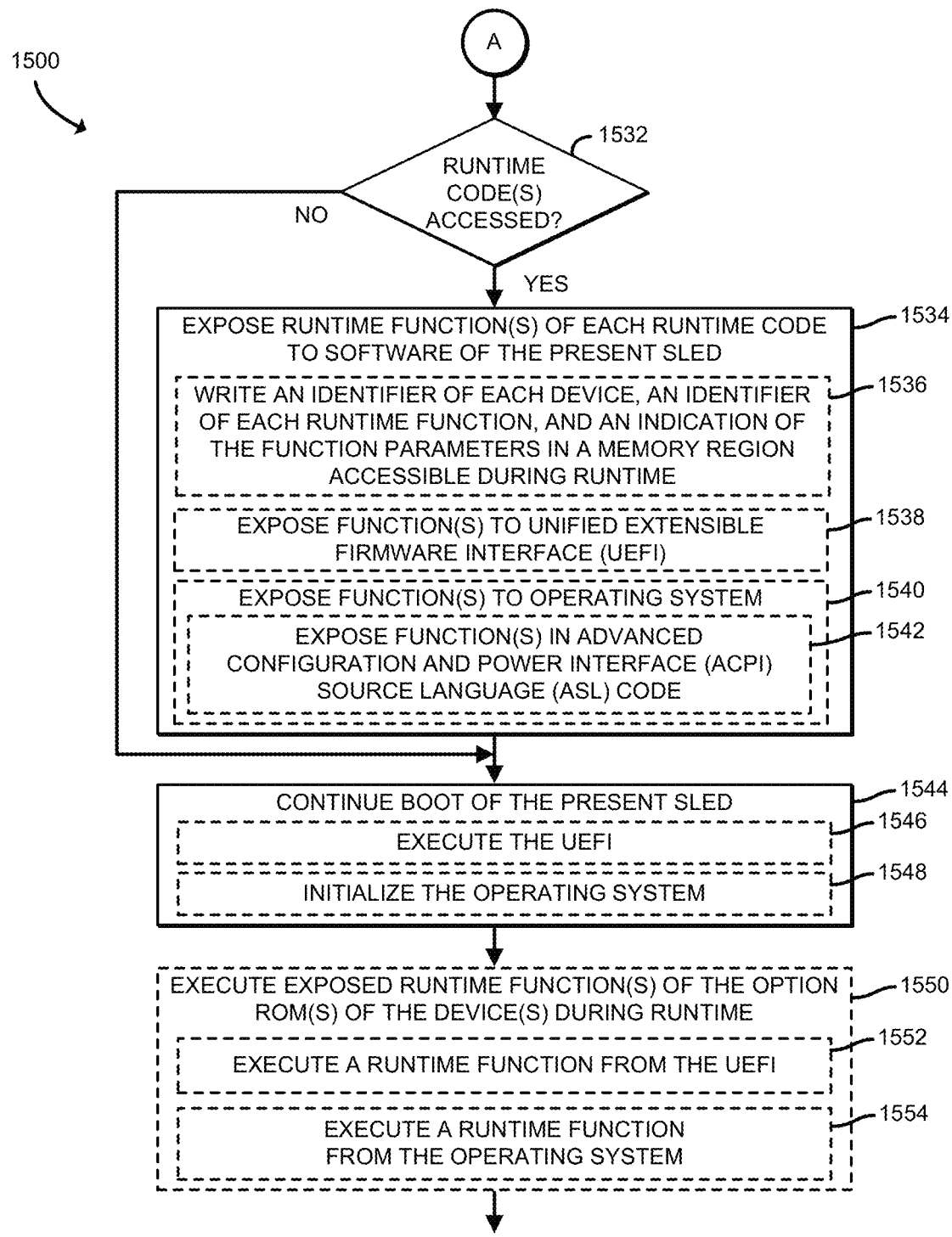

Referring now to FIG. 16, in response to a determination that one or more runtime codes were accessed, the method 1500 advances to block 1534, in which the sled 1230 exposes each identified runtime function to software of the present sled 1230. In doing so, the sled 1230 may write an identifier of each device, an identifier of each runtime function, and an indication of the function parameters, in a memory region that is accessible during runtime, as indicated in block 1536. In exposing the runtime function(s), the sled 1230 may expose the runtime function(s) to a unified extensible firmware interface (UEFI) as indicated in block 1538 and/or to an operating system, as indicated in block 1540. As indicated in block 1542, the sled 1230 may expose the function(s) in an advanced configuration and power interface (ACPI) source language (ASL) code. In some embodiments, the compute sled 1230 (e.g., the BIOS of the compute sled 1230) may copy the runtime code 1324 from the option ROM 1320 to the memory 1306 to enable the runtime code to be executed, while in other embodiments, the runtime code may be executable in place (e.g., in the option ROM 1320).

Subsequently, or if the sled 1230 determined in block 532 that no runtime codes were accessed, the method 1500 advances to block 1544, in which the sled 1230 completes the boot process. In doing so, the sled 1230 may execute the UEFI as indicated in block 1546 and initialize the operating system, as indicated in block 1548. Subsequently, in the illustrative embodiment, the sled 1230 executes an exposed runtime function included in an option ROM of one of the devices (e.g., sending or receiving packets using the NIC 1312, reading and/or writing data to data storage using the data storage device 1314, accelerating one or more functions of a workload using the accelerator device 1316) during runtime, as indicated in block 1550. For example, the sled 1230 may execute the runtime function(s) with the UEFI, as indicated in block 1552 and/or from the operating system, as indicated in block 1554.

EXAMPLES

Illustrative examples of the technologies disclosed herein are provided below. An embodiment of the technologies may include any one or more, and any combination of, the examples described below.

Example 1 includes a sled comprising a device that includes an option read only memory (ROM), wherein the option ROM includes runtime code executable to perform a runtime function of the device; a compute engine to (i) detect, in a boot process, the device on the sled, (ii) access, in the boot process, the runtime code in the option ROM of the detected device to identify the runtime function, and (iii) execute, in a runtime process, the runtime code to perform the runtime function.

Example 2 includes the subject matter of Example 1, and wherein the compute engine is further to access the option ROM through a data bus to which the detected device is connected.

Example 3 includes the subject matter of any of Examples 1 and 2, and wherein to access the option ROM through a data bus comprises to access the option ROM through a peripheral component interconnect express (PCIe) bus.

Example 4 includes the subject matter of any of Examples 1-3, and wherein to access the option ROM through a PCIe bus comprises to access the option ROM through a base address register (BAR) of a PCIe bus.

Example 5 includes the subject matter of any of Examples 1-4, and wherein to access the runtime code in the option ROM comprises to detect a tag indicative of the beginning of a set of runtime functions.

Example 6 includes the subject matter of any of Examples 1-5, and wherein to access the runtime code in the option ROM comprises to detect an identifier for a runtime function in the option ROM.

Example 7 includes the subject matter of any of Examples 1-6, and wherein to access the runtime code in the option ROM comprises to detect a field indicative of a parameter to be provided to a runtime function.

Example 8 includes the subject matter of any of Examples 1-7, and wherein the option ROM further includes boot code executable to configure the device, wherein the compute engine is further to execute, in the boot process, the boot code to configure the detected device.

Example 9 includes the subject matter of any of Examples 1-8, and wherein the compute engine is further to expose the runtime function to software executed by the sled.

Example 10 includes the subject matter of any of Examples 1-9, and wherein to expose the runtime function comprises to write an identifier of the device, an identifier of the runtime function, and an indication of one or more parameters to be provided to the runtime function in a memory region that is accessible during runtime.

Example 11 includes the subject matter of any of Examples 1-10, and wherein to expose the runtime function comprises to expose the runtime function to a unified extensible firmware interface (UEFI) or an operating system of the sled.

Example 12 includes the subject matter of any of Examples 1-11, and wherein to execute the runtime function comprises to execute the runtime function with an operating system of the sled.

Example 13 includes the subject matter of any of Examples 1-12, and wherein to detect the device comprises to detect a network interface controller.

Example 14 includes the subject matter of any of Examples 1-13, and wherein to detect the device comprises to detect an accelerator device.

Example 15 includes the subject matter of any of Examples 1-14, and wherein to detect the device comprises to detect a data storage device.

Example 16 includes the subject matter of any of Examples 1-15, and wherein the sled further comprises a memory, and the compute engine is further to copy the runtime code from the option ROM to the memory before the runtime code is executed and wherein to execute the runtime code comprises to execute the runtime code from the memory.

Example 17 includes the subject matter of any of Examples 1-16, and wherein to execute the runtime code comprises to execute the runtime code in place.

Example 18 includes a method comprising detecting, by a sled and in a boot process, a device on the sled, wherein the device includes an option read only memory (ROM) and wherein the option ROM includes runtime code executable to perform a runtime function of the device; accessing, by the sled and in the boot process, the runtime code in the option ROM of the detected device to identify the runtime function; and executing, by the sled and in a runtime process, the runtime function associated with the runtime code.

Example 19 includes the subject matter of Example 18, and further including accessing, by the sled, the option ROM through a data bus to which the detected device is connected.

Example 20 includes the subject matter of any of Examples 18 and 19, and wherein accessing the option ROM through a data bus comprises accessing the option ROM through a peripheral component interconnect express (PCIe) bus.

Example 21 includes the subject matter of any of Examples 18-20, and wherein accessing the option ROM through a PCIe bus comprises accessing the option ROM through a base address register (BAR) of a PCIe bus.

Example 22 includes the subject matter of any of Examples 18-21, and wherein accessing the runtime code in the option ROM comprises detecting a tag indicative of the beginning of a set of runtime functions.

Example 23 includes the subject matter of any of Examples 18-22, and wherein accessing the runtime code in the option ROM comprises detecting an identifier for a runtime function in the option ROM.

Example 24 includes the subject matter of any of Examples 18-23, and wherein accessing the runtime code in the option ROM comprises detecting a field indicative of a parameter to be provided to a runtime function.

Example 25 includes the subject matter of any of Examples 18-24, and wherein the option ROM further includes boot code executable to configure the device, and the method further comprises accessing, by the sled, the boot code to configure the detected device.

Example 26 includes the subject matter of any of Examples 18-25, and further including exposing, by the sled, the runtime function to software executed by the sled.

Example 27 includes the subject matter of any of Examples 18-26, and wherein exposing the runtime function comprises writing an identifier of the device, an identifier of the runtime function, and an indication of one or more parameters to be provided to the runtime function in a memory region that is accessible during runtime.

Example 28 includes the subject matter of any of Examples 18-27, and wherein exposing the runtime function comprises exposing the runtime function to a unified extensible firmware interface (UEFI) or an operating system of the sled.

Example 29 includes the subject matter of any of Examples 18-28, and wherein executing the runtime function comprises executing the runtime function with an operating system of the sled.

Example 30 includes the subject matter of any of Examples 18-29, and wherein detecting the device comprises detecting a network interface controller.

Example 31 includes the subject matter of any of Examples 18-30, and wherein detecting the device comprises detecting an accelerator device.

Example 32 includes the subject matter of any of Examples 18-31, and wherein detecting the device comprises detecting a data storage device.

Example 33 includes the subject matter of any of Examples 18-32, and further including copying, by the sled, the runtime code from the option ROM to a memory of the sled before the runtime code is executed and wherein executing the runtime code comprises executing the runtime code from the memory.

Example 34 includes the subject matter of any of Examples 18-33, and wherein executing the runtime code comprises executing the runtime code in place.

Example 35 includes a sled comprising means for performing the method of any of Examples 18-34.

Example 36 includes one or more machine-readable storage media comprising a plurality of instructions stored thereon that, in response to being executed, cause a sled to perform the method of any of Examples 18-34.

Example 37 includes a sled comprising a compute engine to perform the method of any of Examples 18-34.

Example 38 includes a sled comprising means for detecting, in a boot process, a device on the sled, wherein the device includes an option read only memory (ROM) and wherein the option ROM includes runtime code executable to perform a runtime function of the device; means for accessing, in the boot process, the runtime code in the option ROM of the detected device to identify the runtime function; and means for executing, in a runtime process, the runtime function associated with the runtime code.

Example 39 includes the subject matter of Example 38, and further including means for accessing the option ROM through a data bus to which the detected device is connected.

Example 40 includes the subject matter of any of Examples 38 and 39, and wherein the means for accessing the option ROM through a data bus comprises means for accessing the option ROM through a peripheral component interconnect express (PCIe) bus.

Example 41 includes the subject matter of any of Examples 38-40, and wherein the means for accessing the option ROM through a PCIe bus comprises means for accessing the option ROM through a base address register (BAR) of a PCIe bus.

Example 42 includes the subject matter of any of Examples 38-41, and wherein the means for accessing the runtime code in the option ROM comprises means for detecting a tag indicative of the beginning of a set of runtime functions.

Example 43 includes the subject matter of any of Examples 38-42, and wherein the means for accessing the runtime code in the option ROM comprises means for detecting an identifier for a runtime function in the option ROM.

Example 44 includes the subject matter of any of Examples 38-43, and wherein the means for accessing the runtime code in the option ROM comprises means for detecting a field indicative of a parameter to be provided to a runtime function.

Example 45 includes the subject matter of any of Examples 38-44, and wherein the option ROM further includes boot code executable to configure the device, and the sled further comprises means for accessing the boot code to configure the detected device.

Example 46 includes the subject matter of any of Examples 38-45, and further including means for exposing the runtime function to software executed by the sled.

Example 47 includes the subject matter of any of Examples 38-46, and wherein the means for exposing the runtime function comprises means for writing an identifier of the device, an identifier of the runtime function, and an indication of one or more parameters to be provided to the runtime function in a memory region that is accessible during runtime.

Example 48 includes the subject matter of any of Examples 38-47, and wherein the means for exposing the runtime function comprises means for exposing the runtime function to a unified extensible firmware interface (UEFI) or an operating system of the sled.

Example 49 includes the subject matter of any of Examples 38-48, and wherein the means for executing the runtime function comprises means for executing the runtime function with an operating system of the sled.

Example 50 includes the subject matter of any of Examples 38-49, and wherein the means for detecting the device comprises means for detecting a network interface controller.

Example 51 includes the subject matter of any of Examples 38-50, and wherein the means for detecting the device comprises means for detecting an accelerator device.

Example 52 includes the subject matter of any of Examples 38-51, and wherein the means for detecting the device comprises means for detecting a data storage device.

Example 53 includes the subject matter of any of Examples 38-52, and further including means for copying the runtime code from the option ROM to a memory of the sled before the runtime code is executed and wherein the means for executing the runtime code comprises means for executing the runtime code from the memory.

Example 54 includes the subject matter of any of Examples 38-53, and wherein the means for executing the runtime code comprises means for executing the runtime code in place.

The invention claimed is:
1. A sled comprising:
a device that includes an option read only memory (ROM), wherein the option ROM includes boot code executable to configure the device during a boot process and runtime code executable to perform a runtime function specific to the device after the sled has completed the boot process; and
a compute engine to (i) detect, in the boot process, the device, (ii) access, in the boot process, the runtime code in the option ROM of the detected device to identify the runtime function, and (iii) execute, in a runtime process and after the boot process has completed, the runtime code to perform the runtime function specific to the device.

2. The sled of claim 1, wherein the compute engine is further to access the option ROM through a data bus to which the detected device is connected.

3. The sled of claim 2, wherein to access the option ROM through a data bus comprises to access the option ROM through a peripheral component interconnect express (PCIe) bus.

4. The sled of claim 3, wherein to access the option ROM through a PCIe bus comprises to access the option ROM through a base address register (BAR) of a PCIe bus.

5. The sled of claim 1, wherein to access the runtime code in the option ROM comprises to detect a tag indicative of the beginning of a set of runtime functions.

6. The sled of claim 1, wherein to access the runtime code in the option ROM comprises to detect an identifier for a runtime function in the option ROM.

7. The sled of claim 1, wherein to access the runtime code in the option ROM comprises to detect a field indicative of a parameter to be provided to a runtime function.

8. The sled of claim 1, wherein the compute engine is further to execute, in the boot process, the boot code to configure the detected device.

9. The sled of claim 1, wherein the compute engine is further to expose the runtime function to software executed by the sled.

10. The sled of claim 9, wherein to expose the runtime function comprises to write an identifier of the device, an identifier of the runtime function, and an indication of one or more parameters to be provided to the runtime function in a memory region that is accessible during runtime.

11. The sled of claim 9, wherein to expose the runtime function comprises to expose the runtime function to a unified extensible firmware interface (UEFI) or an operating system of the sled.

12. The sled of claim 11, wherein to execute the runtime function comprises to execute the runtime function with an operating system of the sled.

13. The sled of claim 1, wherein the device is a first device of a first type, the sled further comprising:
a second device of a second type that is different from the first device, wherein the second device includes an option read only memory (ROM), wherein the option ROM of the second device includes runtime code executable to perform a runtime function specific to the second device after the sled has completed the boot process.

14. The sled of claim 13, wherein the first device is an accelerator device and the second device is a network interface controller or a data storage device.

15. One or more non-transitory machine-readable storage media comprising a plurality of instructions stored thereon that, in response to being executed, cause a sled to:
detect, in a boot process, a device connected to the sled, wherein the device includes an option read only memory (ROM) and wherein the option ROM includes boot code executable to configure the device during a boot process and runtime code executable to perform a runtime function specific to the device after the sled has completed the boot process;
access, in the boot process, the runtime code in the option ROM of the detected device to identify the runtime function; and
execute, in a runtime process and after the boot process has completed, the runtime function associated with the runtime code specific to the device.

16. The one or more non-transitory machine-readable storage media of claim 15, wherein the plurality of instructions further cause the sled to access the option ROM through a data bus to which the detected device is connected.

17. The one or more non-transitory machine-readable storage media of claim 16, wherein to access the option ROM through a data bus comprises to access the option ROM through a peripheral component interconnect express (PCIe) bus.

18. The one or more non-transitory machine-readable storage media of claim 17, wherein to access the option ROM through a PCIe bus comprises to access the option ROM through a base address register (BAR) of a PCIe bus.

19. The one or more non-transitory machine-readable storage media of claim 15, wherein to access the runtime code in the option ROM comprises to detect a tag indicative of the beginning of a set of runtime functions.

20. The one or more non-transitory machine-readable storage media of claim 15, wherein to access the runtime code in the option ROM comprises to detect an identifier for a runtime function in the option ROM.

21. The one or more non-transitory machine-readable storage media of claim 15, wherein to access the runtime code in the option ROM comprises to detect a field indicative of a parameter to be provided to a runtime function.

22. The one or more non-transitory machine-readable storage media of claim 15, wherein the plurality of instructions further cause the sled to access the boot code to configure the detected device.

23. A method comprising:
detecting, by a sled and in a boot process, a device connected to the sled, wherein the device includes an option read only memory (ROM) and wherein the option ROM includes boot code executable to configure the device during a boot process and runtime code executable to perform a runtime function specific to the device after the sled has completed the boot process;
accessing, by the sled and in the boot process, the runtime code in the option ROM of the detected device to identify the runtime function; and
executing, by the sled and in a runtime process and after the boot process has completed, the runtime function associated with the runtime code specific to the device.

24. The method of claim 23, further comprising accessing, by the sled, the option ROM through a data bus to which the detected device is connected.

25. The method of claim 24, wherein accessing the option ROM through a data bus comprises accessing the option ROM through a peripheral component interconnect express (PCIe) bus.

* * * * *